(12) United States Patent
Yamniy et al.

(10) Patent No.: US 10,191,181 B2
(45) Date of Patent: Jan. 29, 2019

(54) MULTI-CHANNEL SYSTEM FOR TRUCK AND CARGO SCANNING USING IMPULSE RADIATION SOURCES

(71) Applicant: ADANI Systems, Inc., Alexandria, VA (US)

(72) Inventors: Vitaliy Yevgenievich Yamniy, Minsk (BY); Vladimir Nikolaevich Linev, Minsk (BY); Kirill Olegovich Yamniy, Minsk (BY)

(73) Assignee: Adani Systems Inc., Alexandria, VA (US)

( * ) Notice: Subject to any disclaimer, the term of this patent is extended or adjusted under 35 U.S.C. 154(b) by 316 days.

(21) Appl. No.: 15/258,108

(22) Filed: Sep. 7, 2016

(65) Prior Publication Data

US 2018/0067226 A1   Mar. 8, 2018

(51) Int. Cl.
*H05G 1/64* (2006.01)
*G01N 23/04* (2018.01)
*G01V 5/00* (2006.01)
*G01T 1/20* (2006.01)

(52) U.S. Cl.
CPC .......... *G01V 5/0016* (2013.01); *G01T 1/2018* (2013.01)

(58) Field of Classification Search
CPC .......... G01T 1/2018; G01T 3/00; G01T 1/20; G01T 1/22; G01V 5/0016; G01V 5/0041; G01V 5/0069; G01V 5/0091; H05H 11/00; G01N 23/04; G01N 2223/639; G01N 23/046; G01N 2223/402; G01N 2223/419; G01N 2223/626; G01N 23/087; G01N 2223/107; G01N 2223/423; G01N 2223/505; G01N 2223/628; G01N 23/02; G01N 23/083; G01N 23/18; G01N 35/00693
USPC ...................................... 378/19, 98.8, 62, 57
See application file for complete search history.

(56) References Cited

U.S. PATENT DOCUMENTS

| | | | |
|---|---|---|---|
| 2007/0025505 A1* | 2/2007 | Bjorkholm ............. | G01N 23/04 378/53 |
| 2007/0034793 A1* | 2/2007 | Estes ..................... | E21B 47/024 250/269.1 |
| 2016/0194558 A1* | 7/2016 | Riddle ..................... | G01T 1/16 250/390.11 |
| 2018/0210109 A1* | 7/2018 | Guo .......................... | G01V 5/06 |

* cited by examiner

*Primary Examiner* — Irakli Kiknadze
(74) *Attorney, Agent, or Firm* — Bardmesser Law Group

(57) ABSTRACT

A multi-channel system for truck scanning, includes an impulse radiation source; and a plurality of detection circuits, each detection circuit comprising a scintillator, a photodiode, a supplemental circuit, an integrator and an ADC, connected in series. A current of the photodiode is proportional to radiation from the impulse radiation source. A data storage device stores outputs of the ADCs and provides the outputs to a computer that converts them to a shadow image of the scanned truck. The supplemental circuit isolates a capacitance of the photodiode from the integrator, filters out low frequency signals from the photodiode, amplifies the signal from the photodiode and reduces a bandwidth of the photodiode seen by the integrator. The supplemental circuit reduces an influence of capacitance of the photodiode on system noise, increases a signal-to-noise ratio of the system, and reduces an influence of photodiode temperature changes on a quality of the scanned image.

17 Claims, 5 Drawing Sheets

MULTI-CHANNEL SYSTEM FOR TRUCK AND CARGO SCANNING USING IMPULSE RADIATION SOURCES

BACKGROUND OF THE INVENTION

Field of the Invention

The invention relates to scanning systems, and, more particularly, to a system for truck and cargo scanning that uses multiple photodetectors with increased sensitivity and improved noise resistance.

Description of the Related Art

A conventional multi-channel system for truck scanning comprises multiple lines of scintillators coupled with photodiodes, where the current of the photodiodes is proportional to a quantum of impulse gamma radiation they are exposed to. The radiation is generated by a radiation source—a betatron. The photodiode current flows to corresponding integrators that convert it to voltage, which, in turn, is converted to a digital value, proportional to the current, by analog-to-digital converters (ADCs). Then, a code containing these numbers is transferred to a data storage device (such as local memory or a register) and further to a computer, so that the computer displays a shadow image of the scanned object, as shown in FIG. 1 (patent RU 2284511; patent RU 2430424; *Journal of Semiconductors*, April 2013, Vol. 34, #4 P045011-1-P045011-6).

In FIG. 1, $101_1$-$101_n$ are scintillators; $102_1$-$102_n$ are photodiodes; $103_1$-$103_n$ are integrators; $104_1$-$104_n$ are analog-to-digital converters; 105 is a data storage device; 106 is a computer; and 107 is an impulse radiation source.

Nevertheless, such conventional systems have the following drawbacks:

Integrator's noise is proportional to photodiode capacitance. In order to improve sensitivity, photodiode area has to be increased accordingly, which results in increased capacitance, up to thousands pF (photodiode PIN-44DI by OSI Optoelectronics), while individual photodiode capacitance may vary, all of which deteriorates image quality.

Temperature fluctuations cause major changes in photodiode reverse current resulting in shifting of output code baselines, which also deteriorates image quality.

Since betatron impulse duration is about 2 μs and usual integration time is 50-100 μs (see descriptions of analog-to-digital converters DDC112, DDC114, DDC118, DDC316, DDC264, etc. designed to convert photodiode current to digital values), integrators spend more time integrating noise and less time integrating signals, which results in lower signal-to-noise ratio.

Accordingly, there is a need in the art for a more sensitive cargo scanning system with higher noise immunity.

SUMMARY OF THE INVENTION

The invention relates to a multi-channel system and detector for cargo scanning, and, more particularly, to a system with a modified photodetector circuit for use with impulse radiation sources that substantially overcomes one or more disadvantages of the related art.

In an exemplary embodiment, a multi-channel system for truck scanning, includes an impulse radiation source; and a plurality of detection circuits, each detection circuit comprising a scintillator, a photodiode, a supplemental circuit, an integrator and an Analog to Digital Converter (ADC), connected in series. A current of the photodiode is proportional to impulse gamma radiation from the impulse radiation source. A data storage device storing outputs of the ADCs and providing the stored outputs to a computer that converts the outputs to a shadow image of the scanned truck. The supplemental circuit isolates a capacitance of the photodiode from the integrator, filters out low frequency signals from the photodiode, amplifies the signal from the photodiode and reduces a bandwidth of the photodiode seen by the integrator. The supplemental circuit reduces an influence of capacitance of the photodiode on system noise, and increases a signal-to-noise ratio of the system. The supplemental circuit reduces an influence of photodiode temperature changes on a quality of the scanned truck image.

The supplemental circuit comprises a low-noise operational amplifier, wherein an output of the photodiode is connected to an inverting input of the amplifier, and a non-inverting input of the low-noise operational amplifier is connected to ground, and a first resistor and a first capacitor, connected in parallel between an output of the low-noise operational amplifier and the inverting input of the low-noise operational amplifier, second resistor, a third resistor and a blocking capacitor, connected in series between the output of the low-noise operational amplifier and an output of the supplemental circuit, and a second capacitor connected between the ground and a point between the second and third resistors.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

To overcome these drawbacks, a supplemental circuit is installed between the photodiodes and integrators, the circuit comprising a low-noise operational amplifier with a low bias voltage of 50-100 µV and a bias current of 1-10 pA, along with a high and low frequency filter. Also, the amplifier's non-inverting input is connected to a common bus, while its inverting input is connected to a photodiode.

Between the amplifier's output and its inverting input, there is a high-value first resistor (around several MΩ) shunted with a smaller capacitance (about 15-30 pF). The amplifier's output is connected to the integrator's input, via second and third resistors and a blocking capacitor connected in series, while the connection point between the second and third resistors is connected to the circuit's common bus, via a second capacitor, as shown in FIG. 2, which illustrates a multi-channel system for truck scanning with a supplemental amplifier circuit.

Figure 2:
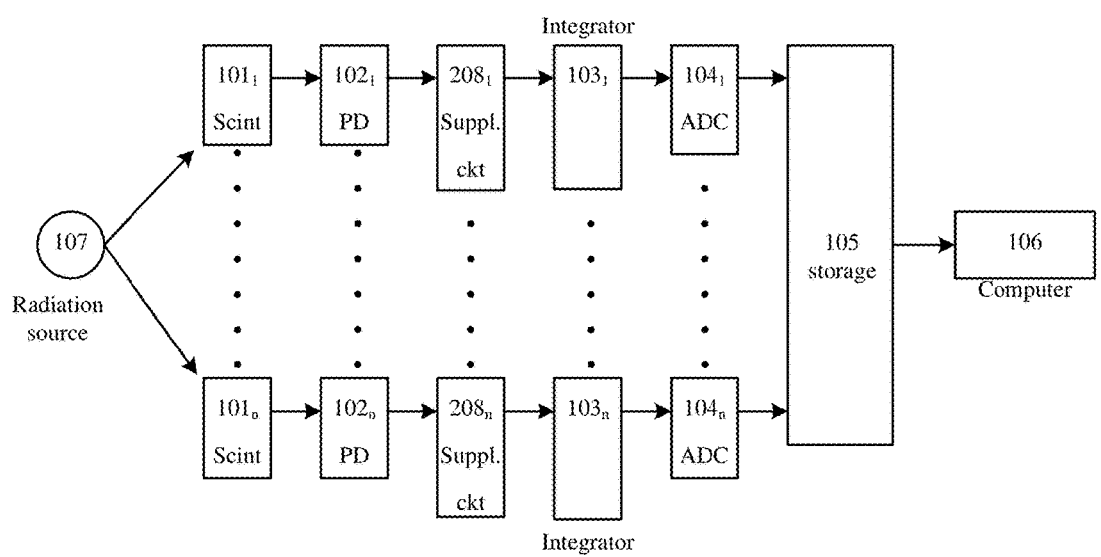
FIG. 2 illustrates a multi-channel system for truck scanning with a supplemental amplifier circuit.

In FIG. 2, 101$_1$-101$_n$ are scintillators; 102$_1$-102$_n$ are photodiodes; 103$_1$-103$_n$ are integrators; 104$_1$-104$_n$ are analog-to-digital converters; 105 is a data storage device; 106 is a computer; 107 is an impulse radiation source; 208$_1$-208$_n$ is a supplemental amplifier circuit. The supplemental circuit isolates a capacitance of the photodiode from the integrator, filters out low frequency signals from the photodiode, amplifies the signal from the photodiode and reduces a bandwidth of the photodiode seen by the integrator.

This solution allows to coordinate signal transfer bandwidth and betatron impulse signal bandwidth with integration time by changing the capacitance that shunts the first resistor, where the cut off frequency $f_c$ for photodiode signal is determined by the equation $2\pi f_c R_1 C_1 = 1$, where $R_1$ is the first resistor value, $C_1$ is its shunting capacitance, while the noise bandwidth $f_n$ is determined by the integration chain second resistor—second capacitor, where $2\pi f_n R_2 C_2 = 1$.

By adding a blocking capacitor at the integrator's input, it is possible to make the output code baseline independent both from temperature fluctuations and possible slight exposure of scintillators to external light signals of constant intensity (e.g., sunlight).

Also, when a supplemental circuit is added, integrator noise is no longer influenced by high photodiode capacitance, as the circuit separates photodiodes from integrators.

Moreover, the supplemental circuit 208 significantly improves total sensitivity of the system by photodiode signal-based amplification, which is $K=R_1/(R_2+R_3)$, where $R_1$ is the first resistor of the supplemental circuit, while $R_2$ and $R_3$ are its second and third resistors correspondingly.

Figure 3:
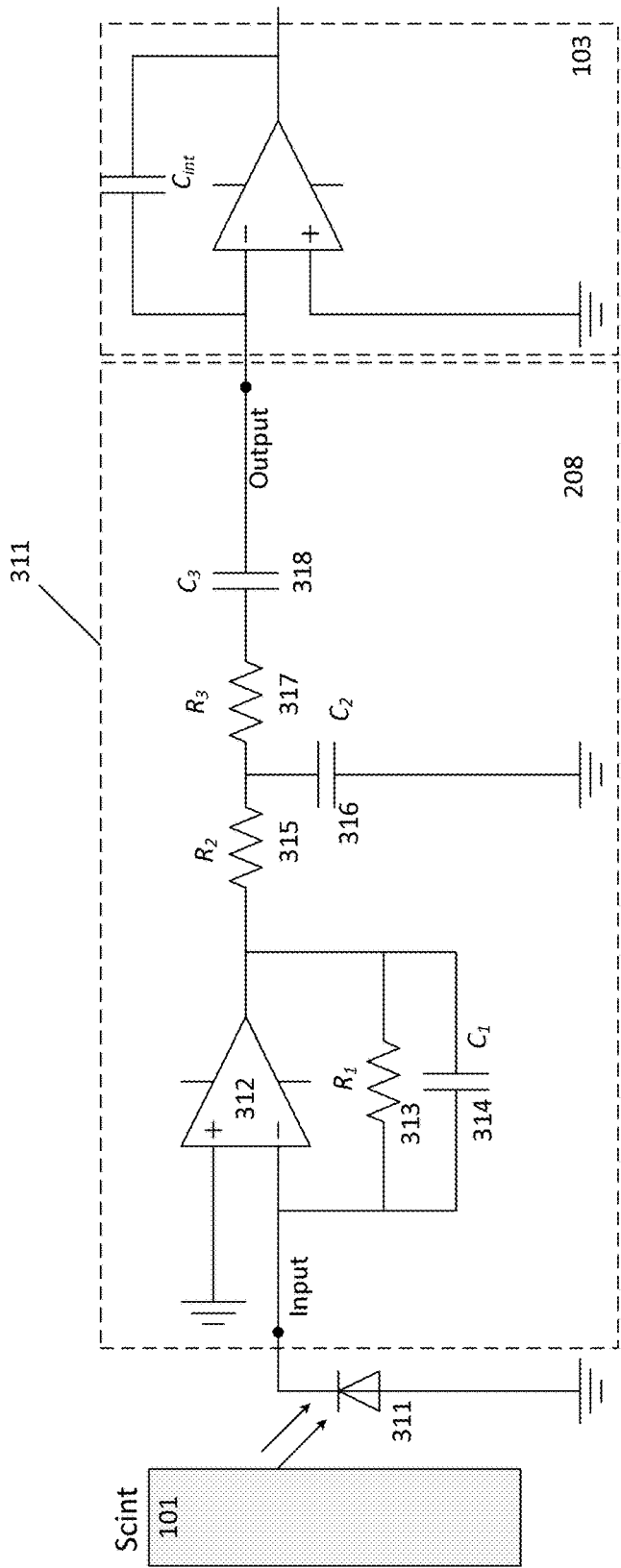
FIG. 3 shows an electronic schematic of one channel containing a supplemental circuit and an integrator.

FIG. 3 shows an electronic schematic of one channel containing a supplemental circuit and an integrator. In FIG. 3, 310 is a supplemental circuit; 311 is a photodiode; 312 is an operational amplifier; 313 is a first resistor $R_1$; 314 is a shunting capacitor $C_1$; 315 is a second resistor $R_2$; 316 is a second capacitor $C_2$; 317 is a third resistor $R_3$; 318 is a blocking capacitor $C_3$ of the high-pass filter.

The blocking capacitor and $R_2+R_3$ are chosen, so that the operational amplifier's output signal would charge the integrator's capacitor up to 90-95% of its maximum value at a pre-set integration time (e.g., at betatron impulse duration of 2 µs, radiation period of 2500 µs, and integration time of 50 µs):

a) if $R_2+R_3=200$ kΩ, then $C_3=1200$-1500 pF;
b) if $R_2+R_3=100$ kΩ, then $C_3=2400$-3000 pF.

Thermal noise of a feedback resistor is $$\sqrt{U_{noise.T}^2} = \sqrt{4kTR_1\Delta f} = 8{,}61 \text{ µV}, \qquad (1)$$

where $k=1.38 \cdot 10^{-23}$ J/K is Boltzmann constant;

$T=300$ K is temperature;
$R_1=5.6$ MΩ is resistance of the feedback resistor;
$\Delta f=800$ Hz is transfer bandwidth.
Dark noise of a photodiode is $$\sqrt{U_{noise.d}^2} = \sqrt{2qI_d R_1^2 \Delta f} = 2{,}85 \text{ µV}, \qquad (2)$$

where $q=1.6 \cdot 10^{-19}$ C;
$I_d=10^{-9}$ A is dark current of the photodiode.
Therefore, total noise of the supplemental circuit is $$\sqrt{U_{noise.tot}^2} = \sqrt{U_{noise.T}^2 + U_{noise.d}^2} = 9 \text{ µV}. \qquad (3)$$

Then, noise current at the input of the integration chain is $$I_{in} = \frac{\sqrt{U_{noise.tot}^2}}{R_2+R_3} = 45 \cdot 10^{-12} \text{ A}, \qquad (4)$$

and its noise charge is $$Q_{noise} = I_{in} \cdot t_{in} = 2250 \cdot 10^{-18} \text{ C}, \qquad (5)$$

where $t_{in}=50 \cdot 10^{-6}$ s is integration time.
Since the $Q_{tot}$ range of ADC DDC118 that corresponds to maximum sensitivity is $50 \cdot 10^{-12}$ C. ADC bit depth is 20 ($n_{tot}=10^6$), therefore an ADC step has a noise of $$Q_{ADC} = \frac{Q_{tot}}{n_{tot}} = 50 \cdot 10^{-18} \text{ C}, \qquad (6)$$

and therefore, the circuit noise, in ADC steps, is $$N = \frac{Q_{noise}}{Q_{ADC}} = 45 \text{ quants}. \qquad (7)$$

Empirical tests of the proposed schematic with a supplemental circuit including a low-noise operational amplifier AD8656 showed that total noise of the demodulation system is less than 32 ADC steps, which is close to the target value.

Figure 1:
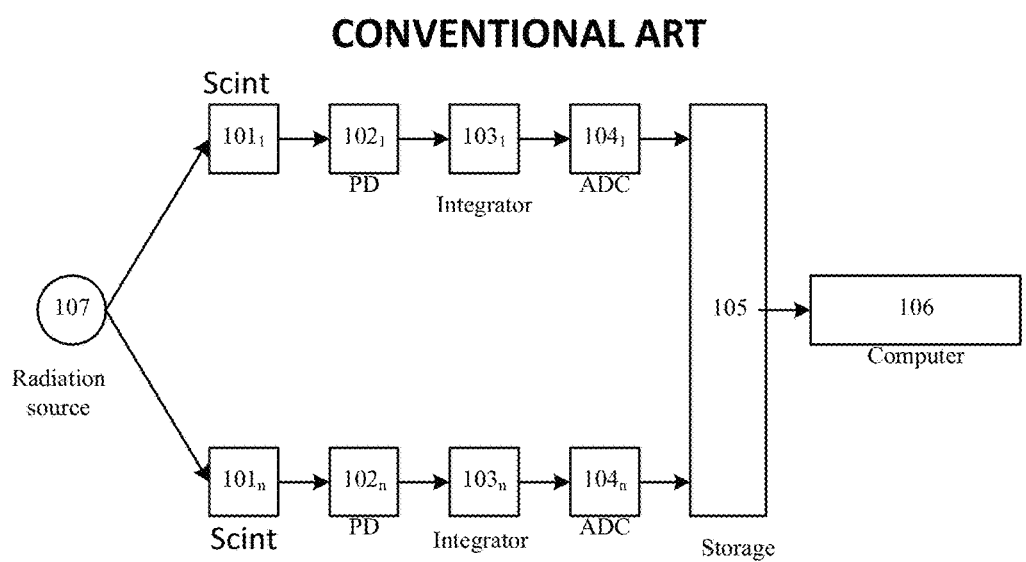
FIG. 1 illustrates a conventional multi-channel system for truck scanning.

An article titled *A low noise multi-channel readout IC for X-ray cargo inspection* (published in *Journal semiconductors*, April, 2013, Vol. 34, #4 P045011-1-P045011-6) describes a schematic similar to FIG. 1, and lists the results of its analysis. The expressions and formulas from this article can be used to calculate noises generated by employing a scintillator, a photodiode, an integrator, and an ADC. The results are as follows:

Total noise of the integration cascade is $$\overline{V_{pre\_sample,tot}^2} \approx \overline{V_{pd\_int,tot}^2}\left(\frac{C_{pd}}{C_f}\right)^2 + \overline{V_{pre\_int,hold}^2}. \qquad (8)$$

The first addend—photodiode noise $\overline{V_{pd\_int,tot}}^2$—is defined as follows:

$$\overline{V_{pd\_int,tot}^2} = \overline{V_{pd\_int,amp}^2} + \overline{V_{pd\_int,hold}^2}, \quad (9)$$

where $$\overline{V_{pd\_int,amp}^2} \approx \frac{4}{3}\alpha \frac{kT}{C_c} \frac{C_f}{C_{pa} + C_f + C_{pd}}, \quad (10)$$

$$\overline{V_{pd\_int,hold}^2} \approx \frac{kT}{C_c} \frac{C_f}{C_{pa} + C_f + C_{pd}} \left( g_m R_{hold} + \frac{C_c}{C_{pd}} \frac{C_{pa} + C_f}{C_f} \right), \quad (11)$$

where $\alpha=2.1$ is correction coefficient; $k=1.38 \cdot 10^{-23}$ J/K is Boltzmann constant; T=300 K; $C_{pd}$=440 pF is photodiode capacitance; $C_f$=12.5 pF is integrator feedback capacitance; $C_{pa}$=2.1 pF is amplifier's input capacitance; $C_c$=128 pF is capacitance added to the amplifier for its stable operation; $g_m$=1271 µΩ; $R_{hold}$=9 kΩ is integrator key resistance.

Meanwhile, amplifier noise $\overline{V_{pre\_int,hold}^2}$ is $$\overline{V_{pre\_int,tot}^2} = \overline{V_{pre\_int,amp}^2} + \overline{V_{pre\_int,hold}^2}, \quad (12)$$

where $$\overline{V_{pre\_int,amp}^2} \approx \frac{4}{3}\alpha \frac{kT}{C_c} \frac{C_{pa} + C_f + C_{pd}}{C_f}, \quad (13)$$

$$\overline{V_{pre\_int,hold}^2} \approx \frac{kT}{C_c} \frac{C_f}{C_{pa} + C_f + C_{pd}} g_m R_{hold} \left( \frac{C_{pd}}{C_f} \right)^2, \quad (14)$$

where total noise is defined by equation 8.

By adding a supplemental circuit between a photodiode and an integrator (as shown in FIG. 2 and FIG. 3), it is possible to remove the influence of photodiode capacitance on the integrator operation. In this case, one may calculate the noise of the analogous schematic when a photodiode with a capacitance of 440 pF is added to the integrator's input and compare it with the noise in case there is no such capacitance at the integrator's input, only an input capacitance of the operational amplifier and a stray capacitance of the board bearing the supplemental circuit of the present invention.

For instance, let total capacitance at the integrator's input be 10 pF, then, using expressions (8)-(14) and the values of both capacitances at the integrator's input (440 pF and 10 pF respectively), it can be calculated that the noise of the analogous schematic would decrease by a factor of 7.3, if the supplemental circuit were added.

Also, the supplemental circuit amplifies the photodiode signal with a factor of up to $K=R_1/(R_2+R_3)$ at direct current.

The schematic was modelled using MicroCap8 software that has shown that when a low-noise amplifier AD8656, a feedback resistor R1 (313)=5600 KΩ, its shunting capacitance $C_1$ (314)=22 pF, R2 (315)=100 KΩ, R3 (317)=100 KΩ, $C_2$ (316)=220 pF, $C_3$ (318)=1200 pF provides a factor of 8.1 amplification of supplemental circuit, where the betatron generates an impulse with a duration of 2 µs.

Thus, by adding a supplemental circuit, as disclosed in the present invention, it is possible to significantly improve the system sensitivity, increase signal-to-noise ratio, significantly reduce the influence of photodiode capacitance on the total noise of the system and reduce the influence of temperature fluctuations on the system operation, thanks to a blocking capacitor $C_3$ (318)=1200 pF. This capacitor also removes slight exposures, which are possible in actual implementation.

The multi-channel system for truck scanning with an impulse radiation source of the present invention was developed and implemented without photodiodes; its noise was around 5-7 steps of a 20-bit ADC DDC118. When photodiodes were added, noise increased to 31-32 ADC quants, wherein $R_1$=5600 KΩ, $C_1$=22 pF, $R_2=R_3$=100 KΩ, $C_2$=220 pF, $C_3$=1200 pF. When $R_2=R_3$ was increased to 510 KΩ, $C_2$ was reduced to 51 pF, and $C_3$ to 240 pF, noise decreased to 7-9, though system sensitivity also decreased. In order to use the full dynamic range of the circuit, the betatron has to be replaced with a more powerful radiation source, i.e., a linatron.

Figure 4:
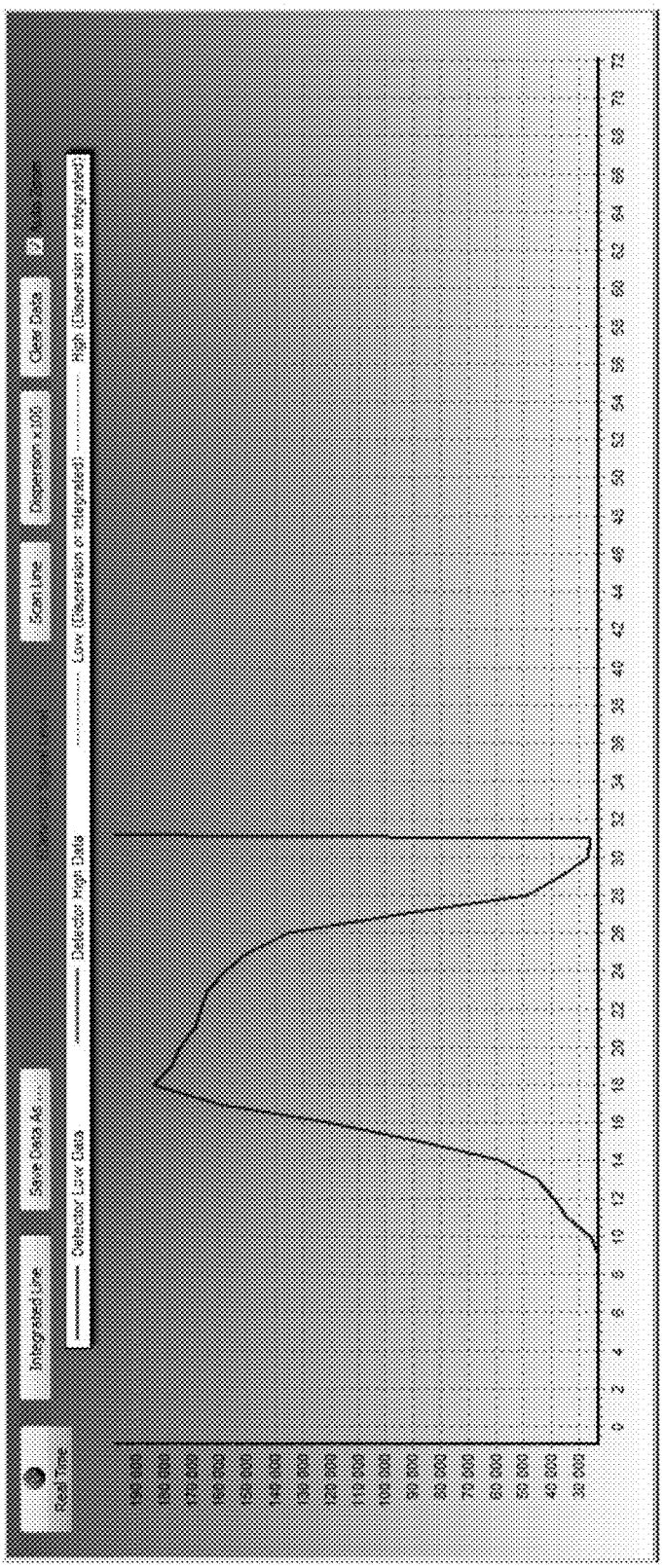
FIG. 4 shows the performance of a conventional detector.
Figure 5:
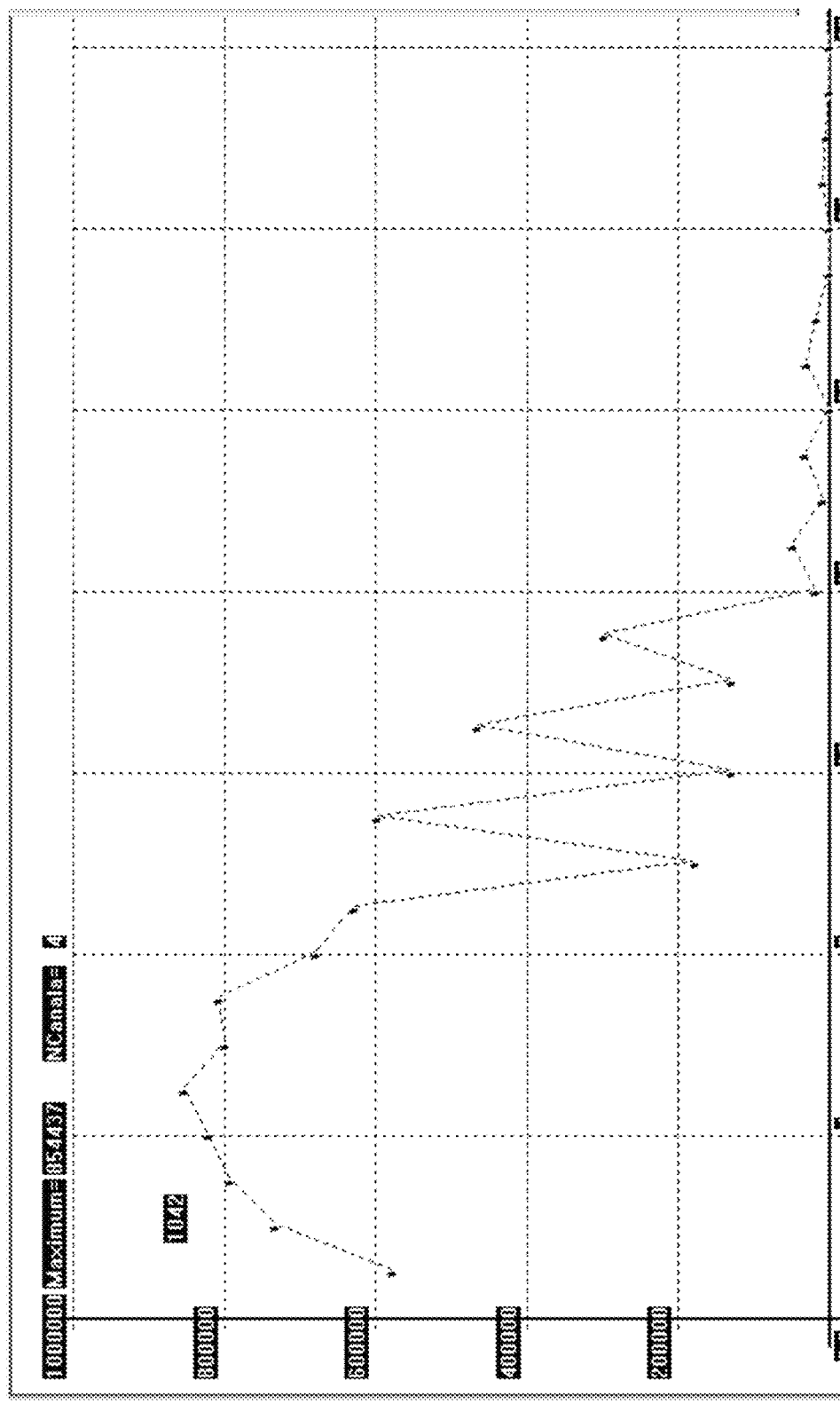
FIG. 5 shows the performance of a detector of the present invention.

Experiments conducted to compare the conventional detector and the detector of the present invention, using a betatron impulse source of the same energy in both cases, show the superiority of the inventive photodector. FIG. 4 shows the conventional detector, which detects less than 200000 radiation quanta, with a noise of 40 units. The inventive photodetector circuit, as shown in FIG. 5, gives over 800000 radiation quanta, with a noise of 30 units.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A multi-channel system for truck scanning, comprising:
   an impulse radiation source;
   a plurality of detection circuits, each detection circuit comprising a scintillator, a photodiode, a supplemental circuit, an integrator and an Analog to Digital Converter (ADC), connected in series,
   wherein a current of the photodiode is proportional to impulse gamma radiation from the impulse radiation source;
   a data storage device storing outputs of the ADCs and providing the stored outputs to a computer that converts the outputs to a shadow image of the scanned truck,
   wherein the supplemental circuit isolates a capacitance of the photodiode from the integrator, filters out low frequency signals from the photodiode, amplifies the signal from the photodiode and reduces a bandwidth of the photodiode seen by the integrator, and
   wherein the supplemental circuit includes a low noise amplifier to reduce an influence of capacitance of the photodiode on system noise.

2. The system of claim 1, wherein the supplemental circuit reduces an influence of photodiode temperature changes on a quality of the scanned truck image.

3. The system of claim 1, wherein the impulse radiation source is a betatron.

4. The system of claim 1, wherein the impulse radiation source generates pulses of about 2 microsecond duration.

5. A multi-channel system for truck scanning, comprising:
   an impulse radiation source;
   a plurality of detection circuits, each detection circuit comprising a scintillator, a photodiode, a supplemental circuit, an integrator and an Analog to Digital Converter (ADC), connected in series,
   wherein a current of the photodiode is proportional to impulse gamma radiation from the impulse radiation source;
   a data storage device storing outputs of the ADCs and providing the stored outputs to a computer that converts the outputs to a shadow image of the scanned truck,
   wherein the supplemental circuit isolates a capacitance of the photodiode from the integrator, filters out low frequency signals from the photodiode, amplifies the signal from the photodiode and reduces a bandwidth of the photodiode seen by the integrator, wherein the supplemental circuit includes a low noise amplifier to increase a signal-to-noise ratio of the system.

6. A multi-channel system for truck scanning, comprising:

an impulse radiation source;

a plurality of detection circuits, each detection circuit comprising a scintillator, a photodiode, a supplemental circuit, an integrator and an Analog to Digital Converter (ADC), connected in series, wherein a current of the photodiode is proportional to impulse gamma radiation from the impulse radiation source;

a data storage device storing outputs of the ADCs and providing the stored outputs to a computer that converts the outputs to a shadow image of the scanned truck, wherein the supplemental circuit comprises:

a low-noise operational amplifier, wherein an output of the photodiode is connected to an inverting input of the amplifier, and a non-inverting input of the low-noise operational amplifier is connected to ground, a first resistor and a first capacitor, connected in parallel between an output of the low-noise operational amplifier and the inverting input of the low-noise operational amplifier, a second resistor, a third resistor and a blocking capacitor, connected in series between the output of the low-noise operational amplifier and an output of the supplemental circuit, and a second capacitor connected between the ground and a point between the second and third resistors.

7. The system of claim 6, wherein the first resistor is at least 2 MΩ.

8. The system of claim 6, wherein the second resistor is 100 KΩ-600 KΩ.

9. The system of claim 6, wherein the third resistor is 100 KΩ-600 KΩ.

10. The system of claim 6, wherein the first capacitor is 15-30 pF.

11. The system of claim 6, wherein the second capacitor is 200-240 pF.

12. The system of claim 6, wherein the blocking capacitor is 1200-3000 pF.

13. The system of claim 6, wherein the low-noise operational amplifier has a bias voltage of up to 100 μV and a bias current of up to 10 pA.

14. A multi-channel system for object scanning, comprising:

an impulse radiation source;

a plurality of detection circuits, each detection circuit comprising a scintillator, a photodiode, a supplemental circuit, an integrator and an Analog to Digital Converter (ADC), connected in series, wherein the photodiode produces an output that is proportional to radiation from the impulse radiation source;

a computer that converts the outputs of the photodiodes to a shadow image of the scanned truck, wherein the supplemental circuit isolates a capacitance of the photodiode from the integrator, amplifies the signal from the photodiode and reduces a bandwidth of the photodiode seen by the integrator, and wherein the supplemental circuit includes a low noise amplifier to reduce an influence of photodiode temperature changes on a quality of the scanned object image.

15. The system of claim 14, wherein the supplemental circuit filters out low frequency signals from the photodiode.

16. The system of claim 14, wherein the supplemental circuit reduces an influence of photodiode temperature changes on a quality of the scanned image.

17. The system of claim 14, wherein the supplemental circuit comprises an operational amplifier, wherein an output of the photodiode is connected to an inverting input of the amplifier, and a non-inverting input of the operational amplifier is connected to ground, a first resistor and a first capacitor, connected in parallel between an output of the operational amplifier and the inverting input of the operational amplifier, a second resistor, a third resistor and a blocking capacitor, connected in series between the output of the operational amplifier and an output of the supplemental circuit, and a second capacitor connected between the ground and a point between the second and third resistors.

* * * * *